United States Patent
Guenach et al.

(10) Patent No.: US 12,501,465 B2
(45) Date of Patent: Dec. 16, 2025

(54) SYSTEM AND METHOD FOR SCHEDULING DISTRIBUTED WIRELESS COMMUNICATION BASED ON RADAR SENSING INFORMATION

(71) Applicant: Imec vzw, Leuven (BE)

(72) Inventors: Mamoun Guenach, Vilvoorde (BE); Andre Bourdoux, Theux (BE)

(73) Assignee: Imec vzw, Leuven (BE)

( * ) Notice: Subject to any disclaimer, the term of this patent is extended or adjusted under 35 U.S.C. 154(b) by 0 days.

(21) Appl. No.: 17/523,630

(22) Filed: Nov. 10, 2021

(65) Prior Publication Data

US 2022/0150909 A1    May 12, 2022

(30) Foreign Application Priority Data

Nov. 11, 2020    (EP) .................................... 20206856

(51) Int. Cl.
*H04W 72/54*    (2023.01)
*G01S 13/88*    (2006.01)
*H04L 5/14*    (2006.01)

(52) U.S. Cl.
CPC ............. *H04W 72/54* (2023.01); *G01S 13/88* (2013.01); *H04L 5/14* (2013.01)

(58) Field of Classification Search
CPC ............... H04W 72/54; H04W 72/541; H04W 52/0216; H04W 52/0238; G01S 13/04;
(Continued)

(56) References Cited

U.S. PATENT DOCUMENTS 9,083,425 B1 *   7/2015 Frolov .................... G05D 1/104
9,775,045 B2    9/2017 Li et al.
(Continued)

FOREIGN PATENT DOCUMENTS

CN   102740490 A    10/2012
WO   2017019595 A1    2/2017
WO   2018103897 A1    6/2018

OTHER PUBLICATIONS

Zhu, Jun et al. Secure Transmissions in Multicell Massive MIMO Systems, Sep. 2014, IEEE Transactions on Wireless Communications, vol. 13, No. 9, 1-16 (Year: 2014).*
Extended European Search Report and Written Opinion, Application No. EP20206856.5, mailed Apr. 30, 2021, 10 pages.
Sun, Xiaofang, Derrick Wing Kwan Ng, Zhiguo Ding, Yanqing Xu, and Zhangdui Zhong. "Physical layer security in UAV systems: Challenges and opportunities." IEEE Wireless Communications 26, No. 5 (2019): 40-47.

(Continued)

*Primary Examiner* — Noel R Beharry
*Assistant Examiner* — Angelie T Ngo
(74) *Attorney, Agent, or Firm* — McDonnell Boehnen Hulbert & Berghoff LLP

(57) ABSTRACT

A system for providing distributed wireless communication for at least one user equipment with connectivity and/or security against at least one eavesdropper is provided. The system includes wireless communication units and a scheduling unit. In this context, the scheduling unit is configured to schedule a first subset of the wireless communication units for radar sensing in order to gather radar sensing information with respect to the at least one user equipment, the environment of the at least one user equipment, the at least one eavesdropper, the environment of the at least one eavesdropper, or any combination thereof. In addition to this, the scheduling unit is configured to schedule a second subset of the wireless communication units for distributing the wireless communication with respect to the at least one user equipment on the basis of the radar sensing information.

20 Claims, 14 Drawing Sheets

(58) Field of Classification Search
CPC .......... G01S 13/06; G01S 13/87; G01S 13/88; H04K 3/41; H04K 3/45; H04K 3/822; H04K 3/825; H04K 3/94; H04K 2203/18; H04K 2203/32; H04K 2203/34; H04K 2203/36; Y02D 30/70; H04B 7/00695; H04L 1/0009; H04L 1/0034; H04L 25/0204

See application file for complete search history.

(56) References Cited

U.S. PATENT DOCUMENTS

| | | | |
|---|---|---|---|
| 10,103,790 B2 | 10/2018 | Wu et al. | |
| 10,505,682 B2 | 12/2019 | Kim et al. | |
| 2005/0249139 A1* | 11/2005 | Nesbit | H04N 21/4788 348/E7.071 |
| 2012/0213113 A1* | 8/2012 | Zhao | H04B 7/024 370/252 |
| 2014/0219449 A1* | 8/2014 | Shattil | H04W 12/08 380/270 |
| 2017/0192089 A1* | 7/2017 | Parker | H04K 3/45 |
| 2018/0263044 A1 | 9/2018 | Zhou et al. | |
| 2019/0229833 A1* | 7/2019 | Ha | H04W 52/267 |
| 2019/0268824 A1 | 8/2019 | Kubota et al. | |
| 2020/0145128 A1 | 5/2020 | Black et al. | |
| 2021/0021331 A1* | 1/2021 | Wyler | H04B 7/0486 |
| 2021/0204117 A1* | 7/2021 | Tang | H04L 63/04 |
| 2021/0314128 A1* | 10/2021 | Li | H04L 5/0091 |
| 2021/0399768 A1* | 12/2021 | Hessler | H04B 7/0413 |
| 2022/0046114 A1* | 2/2022 | Entelis | H04L 12/40 |
| 2022/0394463 A1* | 12/2022 | Fellhauer | H04K 3/825 |
| 2022/0399950 A1* | 12/2022 | Laddu | H04W 12/122 |

OTHER PUBLICATIONS

Kuo, Ping-Heng, and Shin-Lin Shieh. "Achieving physical-layer secrecy via friendly jamming with dynamic role assignment for coordinating transmitters." In 2014 IEEE Wireless Communications and Networking Conference (WCNC), pp. 434-439. IEEE, 2014.

Yu, Qi-Yue, Hong-Chi Lin, and Hsiao-Hwa Chen. "Intelligent radio for next generation wireless communications: An overview." IEEE Wireless Communications 26, No. 4 (2019): 94-101.

Murakami, Takahide, Yoji Kishi, Koji Ishibashi, Keisuke Kasai, Hiroyuki Shinbo, Morihiko Tamai, Kensuke Tsuda et al. "Research project to realize various high-reliability communications in advanced 5G network." In 2020 IEEE Wireless Communications and Networking Conference (WCNC), pp. 1-8. IEEE, 2020.

Ibrahim, Ahmad Al, Alexei Ashikhmin, Thomas L. Marzetta, and David J. Love. "Cell-free massive MIMO systems utilizing multi-antenna access points." In 2017 51st Asilomar Conference on Signals, Systems, and Computers, pp. 1517-1521. IEEE, 2017.

Chen, Zheng, Emil Bjornson, and Erik G. Larsson. "Dynamic resource allocation in co-located and cell-free massive MIMO." IEEE Transactions on Green Communications and Networking 4, No. 1 (2019): 209-220.

Interdonato, Giovanni, Emil Björnson, Hien Quoc Ngo, Pål Frenger, and Erik G. Larsson. "Ubiquitous cell-free massive MIMO communications." EURASIP Journal on Wireless Communications and Networking 2019, No. 1 (2019): 1-13.

Guo, Kaifeng, Yan Guo, and Gerd Ascheid. "Power-saving transmission in MU-Massive-MIMO with distributed antennas and security guarantee." In 2016 IEEE 83rd Vehicular Technology Conference (VTC Spring), pp. 1-5. IEEE, 2016.

\* cited by examiner

SYSTEM AND METHOD FOR SCHEDULING DISTRIBUTED WIRELESS COMMUNICATION BASED ON RADAR SENSING INFORMATION

CROSS-REFERENCE TO RELATED APPLICATIONS

The present application is a non-provisional patent application claiming priority to European Patent Application No. 20206856.5, filed Nov. 11, 2020, the contents of which are hereby incorporated by reference.

FIELD OF THE DISCLOSURE

The disclosure relates to a system for providing distributed wireless communication with respect to at least one user equipment and a method for providing distributed wireless communication with respect to at least one user equipment.

BACKGROUND

Generally, in times of an increasing number of communication applications providing wireless connectivity capabilities, there is a growing need for a system for providing distributed wireless communication with respect to at least one user equipment with connectivity and/or security against at least one eavesdropper and a method for providing distributed wireless communication with respect to at least one user equipment with connectivity and/or security against at least one eavesdropper in order to facilitate communication with respect to such applications.

U.S. Pat. No. 10,103,790 B2 relates to a cooperative transmission system and a cooperative transmission method used in multiple access points in a wireless local network. The cooperative transmission system includes a plurality of access points, a clustering controller, and at least one cluster controller. Each of the access points serves at least one user device within a serving range of the access point. The clustering controller clusters the access points into a plurality of clusters according to locations of the access points and the serving range. The at least one cluster controller controls cooperative synchronous downlink transmissions among all the access points within a cluster governed by the cluster controller, and the clusters, when intersecting with one another, employ an interference suppression mechanism to eliminate interference generated by the user devices or neighboring access points located in different clusters. Through the use of the cooperative communication technique and the interference suppression mechanism, the interference generated by a plurality of access points in a wireless local network due to overlapped basic service sets is avoided. Disadvantageously, especially due to the fact that clustering is merely performed on the basis of the locations of the access points and the serving range, efficiency and reliability of the cooperative transmission cannot be ensured. Further disadvantageously, security of the cooperative transmission has not been considered in any way.

SUMMARY

Accordingly, the disclosure includes a system for providing security against at least one eavesdropper and a method for providing distributed wireless communication with respect to at least one user equipment with connectivity.

For example, the disclosure includes a system for providing distributed wireless communication with respect to at least one user equipment with connectivity and/or security against at least one eavesdropper. The disclosure also includes a method for providing distributed wireless communication with respect to at least one user equipment with connectivity and/or security against at least one eavesdropper.

According to a first aspect of the disclosure, a system for providing distributed wireless communication with respect to at least one user equipment with connectivity and/or security against at least one eavesdropper is provided. The system comprises multiple wireless communication units, and a scheduling unit. In this context, the scheduling unit is configured to schedule a first subset of at least a part of the multiple wireless communication units for radar sensing in order to gather radar sensing information with respect to at least one of the at least one user equipment, the environment of the at least one user equipment, the at least one eavesdropper, the environment of the at least one eavesdropper, or any combination thereof. In addition to this, the scheduling unit is configured to schedule a second subset of at least the part of the multiple wireless communication units for distributing the wireless communication with respect to the at least one user equipment on the basis of the radar sensing information.

It is noted that in addition to or as an alternative of scheduling the second subset of at least the part of the multiple wireless communication units for distributing the wireless communication with respect to the at least one user equipment on the basis of the radar sensing information, the scheduling unit may be configured to schedule the second subset of at least the part of the multiple wireless communication units for distributing the wireless communication with respect to the at least one user equipment on the basis of the respective targeted connectivity, for example the corresponding quality of service thereof, and/or the respective connectivity operational data.

For example, the scheduling unit may be configured to determine the transmit power and/or beamforming behavior of at least one of at least the part of the multiple wireless communication units.

The first subset may be configured or scheduled by the scheduling unit to transmit its own radar signal or to be in a receive only mode.

With respect to the transmitting its own radar signal, it is noted that the radar signal can for example use the same modulation as the second subset or a different modulation.

Additionally or alternatively, the radar signal can be transmitted simultaneously to the respective communication signals of at least one of at least the part of the multiple wireless communication units or in different time slots.

With respect to the above-mentioned receive only mode, the respective communication signals of at least one of at least the part of the multiple wireless communication units for example in the corresponding downlink may act as radar signals.

In addition to this or as an alternative, the signals transmitted by the at least one user equipment especially in the uplink may act as radar signals. In particular, the respective known preambles and/or pilots may for example be used in this context.

According to a first implementation form of the first aspect of the disclosure, the scheduling unit is configured to schedule a third subset of at least the part of the multiple wireless communication units for interfering the at least one eavesdropper on the basis of the radar sensing information.

According to a second implementation form of the first aspect of the disclosure, the first subset and the second subset overlap each other. In addition to this or as an alternative, for example in the case of the third subset, at least two of the first subset, the second subset, and the third subset, for example the first subset and the third subset, overlap each other.

According to a further implementation form of the first aspect of the disclosure, interfering the at least one eavesdropper for example comprises sending or beamforming noise, for example artificial noise, to the at least one eavesdropper.

For example, the noise or the artificial noise, respectively, may be configured in a manner that it has less or the least impact on the second subset, for example on the signals of the second subset. Alternatively, the noise or the artificial noise, respectively, may be configured in a manner that it has less or the least impact on the first subset and the second subset, for example on the signals of the first and the second subset.

In the case that the noise or the artificial noise, respectively, is not orthogonal to the signals of the second subset, the respective PHY settings may for example be adjusted such that the at least one user equipment can operate in harsh conditions such as a low signal-to-noise ratio regime. For example, the scheduling unit is configured to perform the adjustment. The scheduling unit may for example suggest configuration profiles, for example regarding PHY settings and/or network slicing, that may trigger a reconfiguration of the respective network, such as applying new PHY settings for at least a part of the multiple wireless communication units from the second subset and/or at least one of the at least one user equipment with high security risk and/or suffering from respective artificial noise.

For example the PHY settings relate to at least one of power control, beamforming, for example determination thereof, forward error correction(s), or any combination thereof.

According to a further implementation form of the first aspect of the disclosure, the scheduling unit is for example configured to schedule another subset of at least the part of the multiple wireless communication units for being deactivated on the basis of the radar sensing information. For example, unneeded resources can efficiently be switched off, which saves power.

According to a further implementation form of the first aspect of the disclosure, the system for example comprises at least one processing unit connected to at least the part of the multiple wireless communication units in a connection line, for example being based on a wired connection, for example comprising or being a fronthaul link. In this context, the at least one processing unit is configured to provide operational information for the scheduling unit in addition to the radar sensing information.

According to a further implementation form of the first aspect of the disclosure, the multiple wireless communication units for example comprise or are multiple access points. In addition to this or as an alternative, the distributed wireless communication is based on time division duplexing. Additionally or alternatively, in the case of the at least one processing unit, the scheduling unit comprises at least one of the at least one processing unit.

According to a further implementation form of the first aspect of the disclosure, the radar sensing information for example comprises ground mapping information and/or localization information regarding the at least one user equipment and/or the at least one eavesdropper. For instance, reliability can further be increased by reducing complexity.

According to a further implementation form of the first aspect of the disclosure, the operational information for example comprises at least one of topology, for example access topology, of the distributed wireless communication, channel quality indication with respect to the distributed wireless communication, position, for example geographical position, of at least one of the least one user equipment, position, for example geographical position, of at least one of at least the part of the multiple wireless communication units, noise, for example measured noise, with respect to at least one of the at least one user equipment, traffic requirements of a user, quality of service requirements, or any combination thereof.

According to a further implementation form of the first aspect of the disclosure, the scheduling unit is for example configured to perform scheduling with the aid of at least one of the at least one processing unit.

According to a second aspect of the disclosure, a method for providing distributed wireless communication with respect to at least one user equipment with connectivity and/or security against at least one eavesdropper is provided. The method comprises the steps of scheduling a first subset of at least a part of multiple wireless communication units for radar sensing in order to gather radar sensing information with respect to at least one of the at least one user equipment, the environment of the at least one user equipment, the at least one eavesdropper, the environment of the at least one eavesdropper, or any combination thereof with the aid of a scheduling unit, and scheduling a second subset of at least the part of the multiple wireless communication units for distributing the wireless communication with respect to the at least one user equipment on the basis of the radar sensing information with the aid of the scheduling unit.

According to a first implementation form of the second aspect of the disclosure, the method for example comprises the step of scheduling a third subset of at least the part of the multiple wireless communication units for interfering the at least one eavesdropper on the basis of the radar sensing information with the aid of the scheduling unit.

According to a second implementation form of the second aspect of the disclosure, the first subset and the second subset for example overlap each other. In addition to this or as an alternative, in the case of the third subset, at least two of the first subset, the second subset, and the third subset, for example the first subset and the third subset, overlap each other.

According to a further implementation form of the second aspect of the disclosure, interfering the at least one eavesdropper for example comprises sending or beamforming noise, for example artificial noise, to the at least one eavesdropper.

According to a further implementation form of the second aspect of the disclosure, the method for example comprises the step of scheduling another subset of at least the part of the multiple wireless communication units for being deactivated on the basis of the radar sensing information with the aid of the scheduling unit. For example, unneeded resource can be switched off, which saves power.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
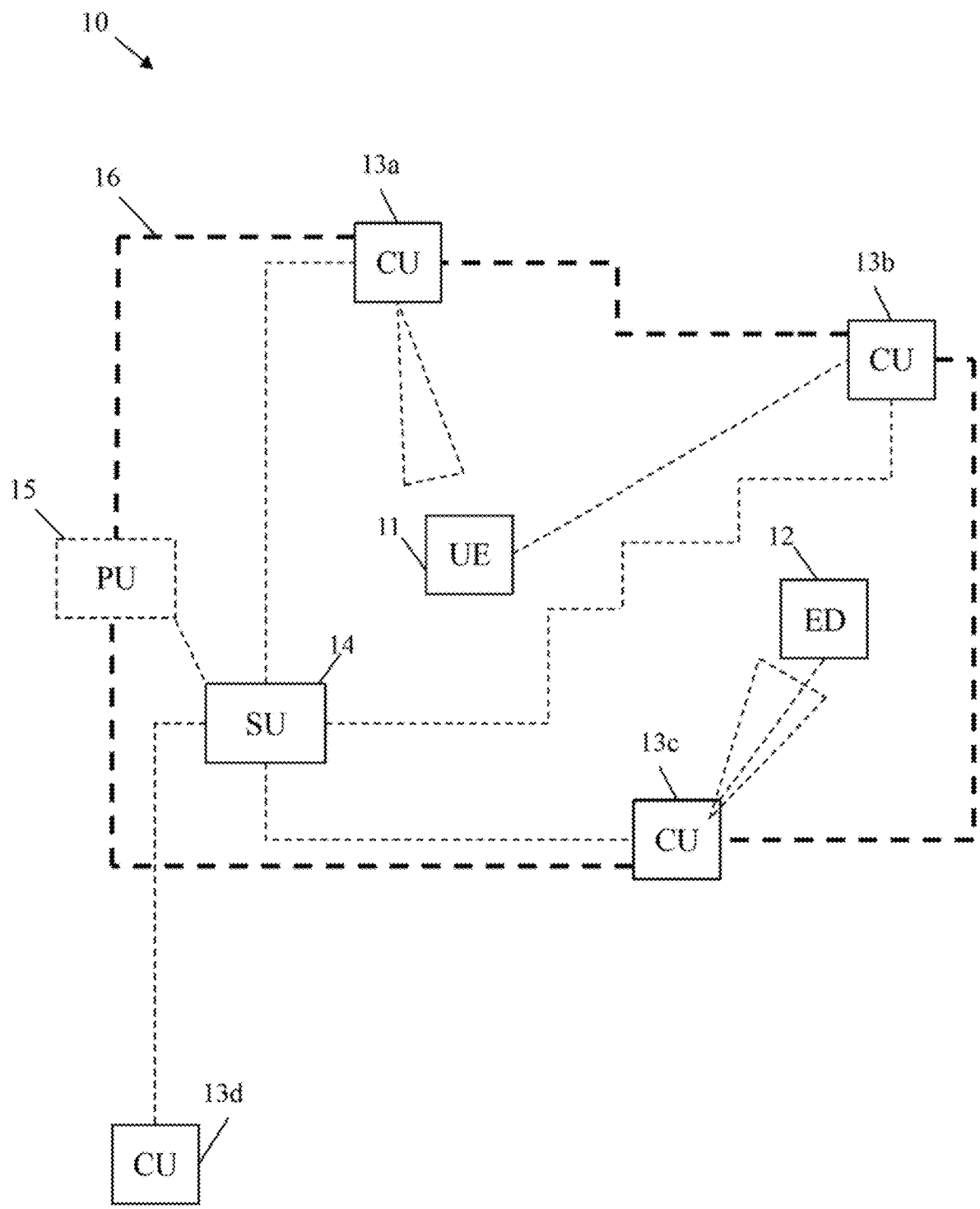
FIG. 1 shows a block diagram of a system, according to an example.

FIG. 1 is a block diagram of a system 10 for providing distributed wireless communication with respect to at least one user equipment 11 with connectivity and/or security against at least one eavesdropper 12.

The system 10 comprises multiple wireless communication units 13a, 13b, 13c, 13d, and a scheduling unit 14. In this context, the scheduling unit 14 is configured to schedule a first subset of the multiple wireless communication units 13a, 13b, 13c, 13d for radar sensing in order to gather radar sensing information with respect to the user equipment 11, the environment of the user equipment 11, the eavesdropper 12, the environment of the eavesdropper 12, or any combination thereof.

As it can be seen from FIG. 1, the wireless communication unit 13a is used for radar sensing with respect to the user equipment 11 and/or the environment thereof, whereas the wireless communication unit 13c is used for radar sensing with respect to the eavesdropper 12. Furthermore, the scheduling unit 14 is configured to schedule a second subset of the multiple wireless communication units 13a, 13b, 13c, 13d for distributing the wireless communication with respect to the user equipment 11 on the basis of the radar sensing information.

The wireless communication unit 13b is used for distributing the wireless communication with respect to the user equipment 11. Moreover, the scheduling unit 14 may be configured to schedule a third subset of the multiple wireless communication units 13a, 13b, 13c, 13d for interfering the eavesdropper 12 on the basis of the radar sensing information.

For example, the wireless communication unit 13c is used for interfering the eavesdropper 12. For example, the first subset and the second subset overlap each other.

In addition to this or as an alternative, at least two of the first subset, the second subset, and the third subset, for example the first subset and the third subset, overlap each other. For example, in the sense of the above-mentioned case of overlapping first and third subsets, this is the case for the wireless communication unit 13c.

For example, interfering the at least one eavesdropper 12 comprises sending or beamforming noise, for example artificial noise, to the eavesdropper 12. Furthermore, the scheduling unit 14 may be configured to schedule another subset of the multiple wireless communication units 13a, 13b, 13c, 13d for being deactivated on the basis of the radar sensing information. For example, this is the case for the wireless communication unit 13d because of rather great distance between the user equipment 11 and the wireless communication unit 13d.

Optionally, the system 10 may comprise a processing unit 15 connected to the multiple wireless communication units 13a, 13b, 13c in a connection line 16, for example being based on a wired connection, for example comprising or being a fronthaul link. In this context, the processing unit 15 may for example be configured to provide operational information for the scheduling unit 14 in addition to the radar sensing information.

With respect to the multiple wireless communication units 13a, 13b, 13c, 13d, it is noted that the multiple wireless communication units 13a, 13b, 13c, 13d may comprise or be multiple access points. In addition to this or as an alternative, the distributed wireless communication may be based on time division duplexing.

Further additionally or further alternatively, the scheduling unit 14 may comprise at least one of the processing unit 15. Furthermore, with respect to the above-mentioned radar sensing information, for example the radar sensing information comprises ground mapping information and/or localization information regarding the user equipment 11 and/or the eavesdropper 12.

Moreover, with respect to the operational information, for example the operational information comprises at least one of topology, for example access topology, of the distributed wireless communication, channel quality indication with respect to the distributed wireless communication, position, for example geographical position, of the user equipment 11, position, for example geographical position, of the multiple wireless communication units 13a, 13b, 13c, 13d, noise, for example measured noise, with respect to the user equipment 11, traffic requirements of a user, quality of service requirements, or any combination thereof.

For example, the scheduling unit 14 is configured to perform scheduling for example with the aid of the processing unit 15.

Figure 2:
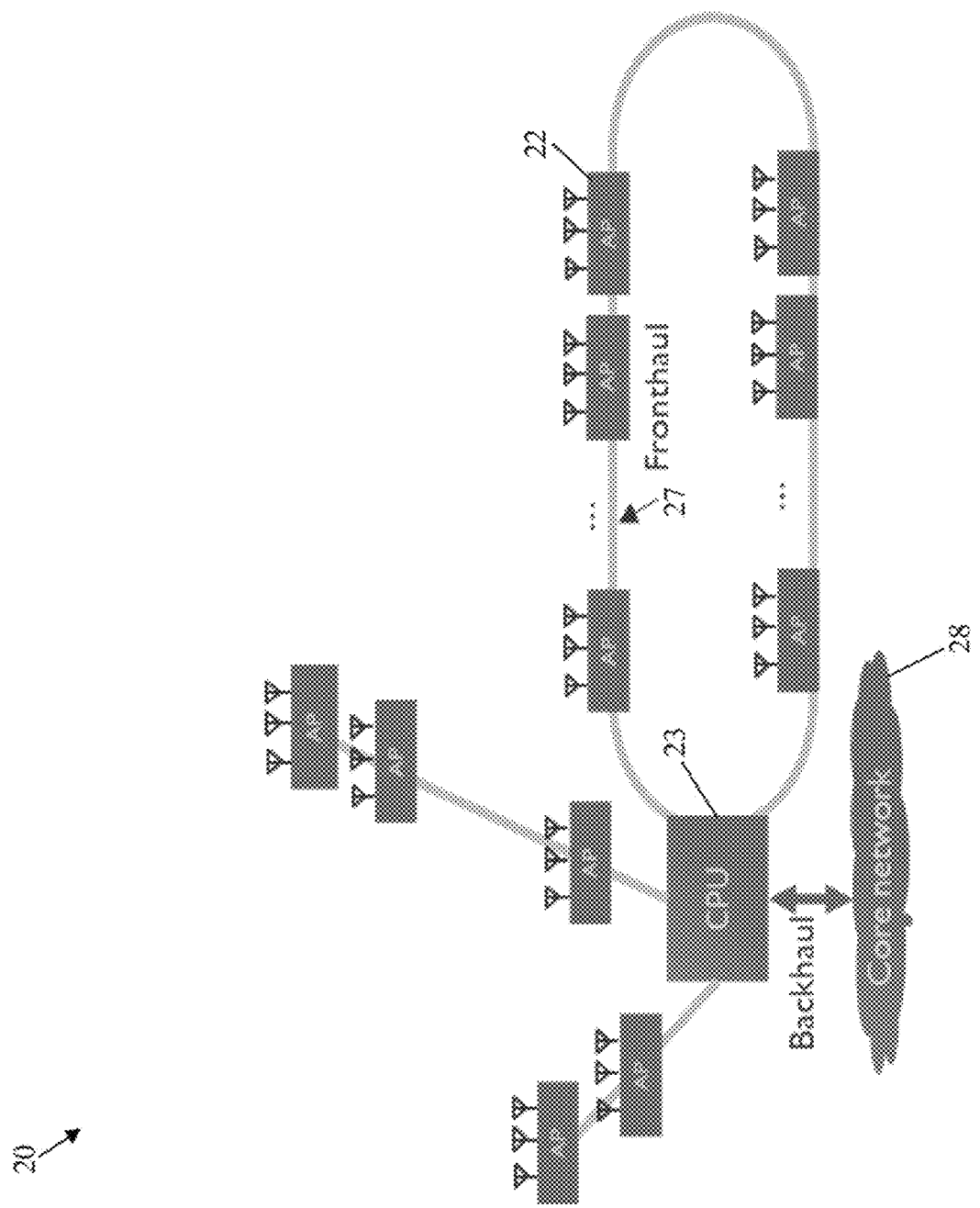
FIG. 2 shows a cell free massive MIMO system, according to an example.

Now, with respect to FIG. 2, a cell free massive MIMO system 20 is illustrated. A cell free (CF) massive MIMO system 20, as depicted in FIG. 2, is a combination of massive multiple-input multiple-output (MIMO) dense distributed topology with a user centric design.

With respect to cell free massive MIMO, it is noted that cable strips, for example radio strips or radio cable strips, may be employed. Such a strip may for example comprise multiple antennas and corresponding processing units. As it can be seen from FIG. 2, the system 20 comprises access points (22), often referred to as APs, which are for example non-collocated access points.

It is noted that each of the APs may be equivalent to or a kind of a wireless communication unit such as one of the communication units 13a, 13b, 13c, 13d according to FIG. 1. Furthermore, the system 20 comprises one more central processing units (CPUs), specifically the CPU 23. The CPU 23 may be equivalent to or a kind of the processing unit 15 of FIG. 1.

As it can further be seen from FIG. 2, in accordance with the system 20, the APs and CPU(s) are connected through some high-speed fronthaul (FH) wires 27 such as (glass) fiber, twisted pairs, coax, plastic (optical fiber), to carry at least one of data, power, clock information, or any combination thereof. It is noted that the FH may be equivalent to or a kind of the connection line 16 according to FIG. 1. Furthermore, the CPU 23 may for example be connected to a core network 28 via a backhaul.

It is noted that the scheduling unit 14 may be configured to determine a respective operating mode of a subset, for example each, of the APs.

It is further noted that these operating modes have implicitly been introduced in the context of FIG. 1. However, for the sake of completeness, the modes are explained in greater detail in the following:
  Connectivity mode: The subset of APs in this cluster are dedicated to regular data communications to serve the user equipments (UEs). These APs are labelled D-APs;
  Security mode: The subset of APs in this cluster are dedicated to secure the connectivity links by sending a shaped artificial noise (AN). The AN has the aim of having as low interference as possible towards the UEs while at the same time jamming eavesdropper reception;
  Radar sensing mode: The subset of APs in this cluster are dedicated to radar sensing by sending radar signals and/or receiving reflections. The radar signals have the aim of being less interfering towards the connectivity signals, while at the same time can be efficiently used for indoor sensing;
  Hybrid mode: The two subsets can be overlapping sets where some AP can serve both for connectivity and/or security and/or radar sensing purposes. The slicing is updated at regular basis depending on the connectivity, security, and radar sensing requirements; and
  Idle mode or quiet mode: The scheduler can also decide to switch-off some APs.

Figure 3:
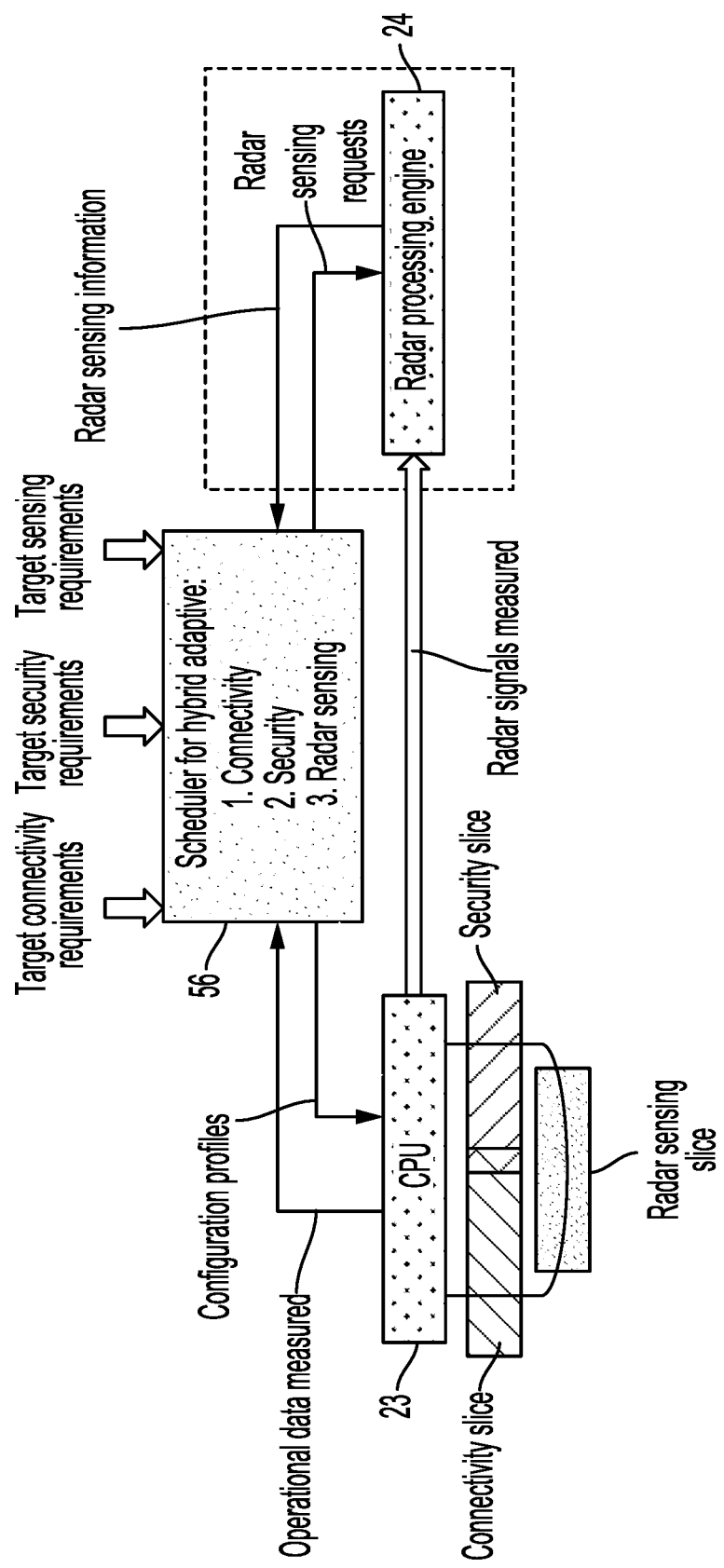
FIG. 3 shows an intelligent scheduler for slicing the network to accommodate connectivity, security, and radar sensing target requirements, according to an example.

Furthermore, a scheduler 56 such as the scheduling unit 14, as illustrated in greater detail by FIG. 3, for example depending on the connectivity and/or security and/or sensing requirements and/or based on the radar sensing information, may adaptively slice the cell-free network by allocating more or less resources for connectivity and/or security and/or radar sensing.

In addition to this or as an alternative, the scheduler 56, for example depending on the connectivity and/or security and/or sensing requirements and/or based on the radar sensing information, may adapt the physical layer setting such as power allocation, equalization, channel coding, modulation, or any combination thereof.

To perform the above-mentioned tasks, the scheduler 56 may be fed with at least one of (or any combination thereof):
  Targeted connectivity requirements, which could be, for instance, the targeted data rate (or spectral efficiency), the targeted error performance of the connectivity links;
  Targeted security requirements, which could be, for instance, a lower bound on the error performance of eavesdropper reception;
  Targeted radar sensing requirements, which could be, for instance, targeted angular/range resolutions;
  Inputs from the radar processing engine 24, which could be, for instance:
  Ground mapping
  Localization information on the active UEs, eavesdroppers and the surrounding static/moving targets such as geographical positions;
  Operational data from the CPU 23 which could be, for instance:
  Current connectivity link quality indication
  The measured and/or estimated channels between the APs and UEs
  The measured UE noises
  Cell-free network topology and/or geometry which may be communicated once as the cell-free network topology does not change: for example, geographical positions of the APs.

With respect to the radar processing engine 24 mentioned above, it is noted that the scheduler 56 or the CPU 23 may comprise the radar processing engine 24. Based on at least a part of these inputs and/or any historical data, the scheduler 56 may estimate the respective link quality between each of the APs and eavesdroppers, for instance, based on the geographical positions of the corresponding eavesdroppers and/or the access topology.

This may give an indication on how good or bad is an AP from the link security point of view when used for data transmission. Furthermore, the scheduler 56 may also decide which APs should be used for radar sensing, which may depend on the security threats and/or the required reliability and/or respective environment changes. The scheduler 56 may also adapt the physical layer settings such as power control, beamforming, modulation, coding, or any combination thereof.

In the case that more security threats are detected, robust physical layer configurations may be selected and more APs may be used for security and sensing to better protect the connectivity. The selected configuration (APs scheduling and physical layer configuration), may then be communicated to the CPU 23 that, accordingly, may reconfigure the respective cell free network. This configuration can be regularly updated at low or high pace depending on eavesdropping risk that may continuously be monitored and/or evaluated by the scheduler 56.

If there is a high risk, for instance, many localized eavesdroppers cooperating to attack, some users could be labeled as high risk connectivity. In such case, they could use other time and/or frequency resources if available. If not, they could temporarily be discarded from connectivity because of the high threat if they are, for example, in the vicinity of eavesdroppers and/or if they are running sensitive applications.

Figure 4:
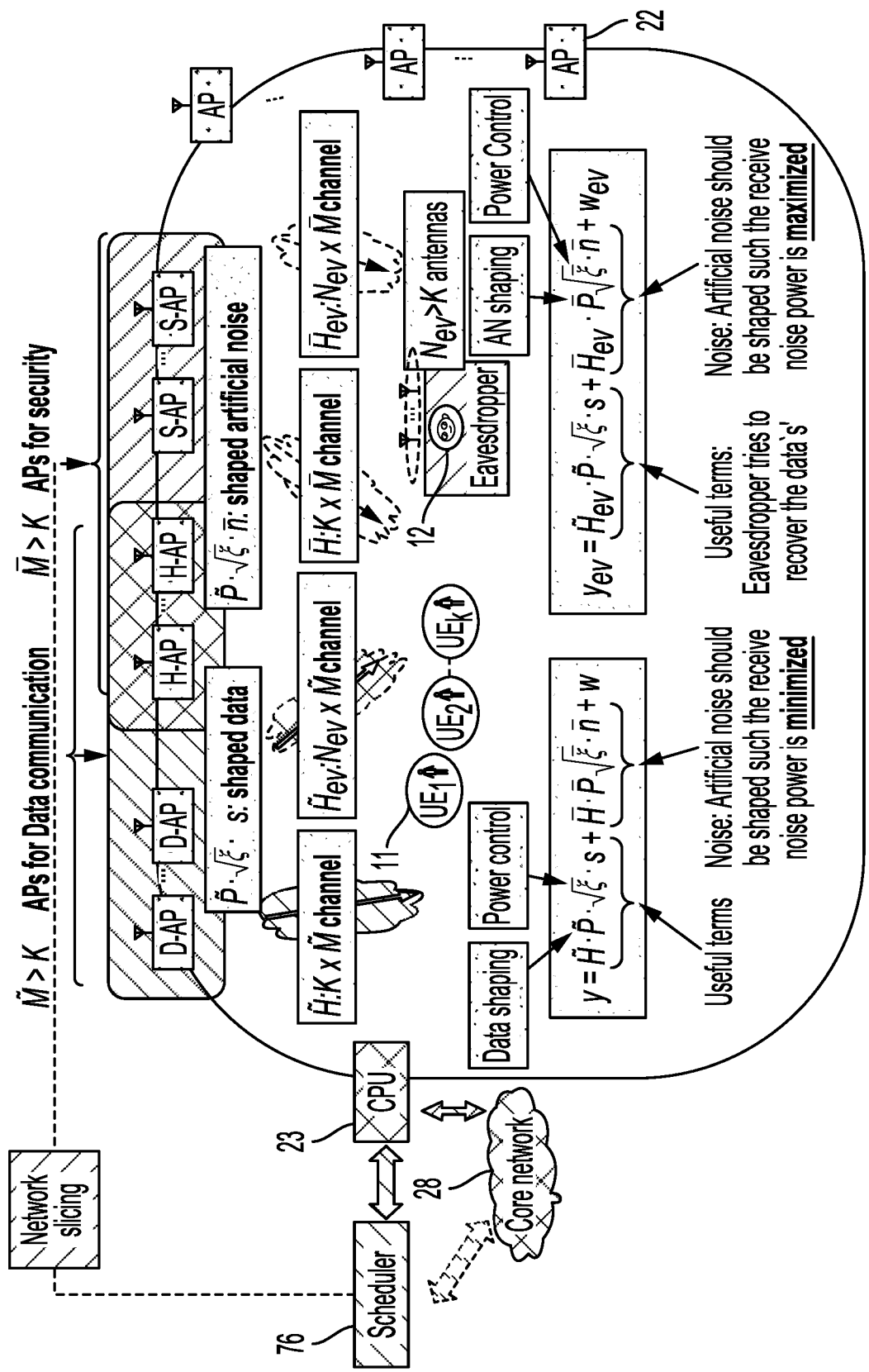
FIG. 4 shows a model for data communication and artificial noise generation, according to an example.

In accordance with FIG. 4, the scheduler 76, depending on the connectivity and/or security requirements, may adaptively slice the cell free network by allocating more or less resources for connectivity ($\tilde{M}$ D-APs) and/or for security ($\overline{M}$ S-APs).

In addition to this or as an alternative, the scheduler 76, depending on the connectivity and/or security requirements, may adapt the signal processing, for instance:

Power allocation of the data (through $\tilde{\xi}$) and/or of the AN (through $\overline{\xi}$) subject to maximum power per AP;

Shaping (or Precoding) of the data (through $\tilde{P}$) and/or of the AN (through $\overline{P}$);

AN design through, for example, the type of noise (stationary, impulsive noise) and its statistical properties.

With respect to the scheduler 76, it is noted that the scheduler 76 may be equivalent to or a kind of the above-mentioned scheduler 56 and/or the above-mentioned scheduling unit 14. In addition to this or as an alternative, the schedulers or the scheduling unit, respectively, may be interchangeable with regard to each other. This may analogously apply to further scheduler embodiments explained in the following.

Again, with respect to the scheduler 76, when executing these tasks, the scheduler 76 can make sure that the target connectivity and/or security requirements are fulfilled. Relevant performance measures are error performance of the UEs that could be minimized and of eavesdroppers that could be maximized.

More formally, the AN noise power as received by the UEs (see the term $$\tilde{H} \cdot \overline{P} \sqrt{\overline{\xi}} \cdot \overline{n}$$

in FIG. 4) could be as low as possible, while the AN noise power as received by eavesdroppers (see the term $$\tilde{H}_{ev} \cdot \overline{P} \sqrt{\overline{\xi}} \cdot \overline{n}$$

in FIG. 4) could be maximized. For instance, using linear zero-forcing (ZF) shaper (iso precoder), the data can be precoded using $\tilde{P} = \tilde{H}^H (\tilde{H} \cdot \tilde{H}^H)^{-1}$ and the AN $\overline{n}$ can be shaped for example using the orthogonal complement of $\tilde{H}$ such that $\tilde{H} \cdot \overline{P} = 0$ and $\overline{p}^H \cdot \overline{P} = 1_d$. In this case, the AN is completely cancelled at the UEs. The dimension of the orthogonal complement $\overline{P}$ denoted $\overline{K}$ could be such that $\overline{K} \leq \dim(\overline{H}) = \overline{M} - K$, and is a parameter that can be exploited in the shaped AN.

For the example system model described according to FIG. 4, the average signal to noise ratio (SNR) of the k-th UE is $\gamma_k = E\{\tilde{\xi}_{k,k}\}/\sigma_w^w$. For eavesdropper detecting the data of the k-th user, the SNR can be derived assuming a linear ZF detection for eavesdropper through $$\sqrt{\tilde{\xi}^{-1}} \cdot P_{ev} = \sqrt{\tilde{\xi}^{-1}} \left( \tilde{P}^H \cdot \tilde{H}_{ev}^H \cdot \tilde{H}_{ev} \cdot \tilde{P} \right)^{-1} \cdot \tilde{P}^H \cdot \tilde{H}_{ev}^H, \text{ is}$$

$$\gamma_{ev,k} = E\left\{ \frac{\tilde{\xi}_{k,k}}{\left[ \tilde{H}_{ev,\mathit{eff}} \cdot \sqrt{\overline{\xi}} \cdot \overline{R} \cdot \sqrt{\overline{\xi}} \cdot \tilde{H}_{ev,\mathit{eff}}^H \right]_{k,k} + \lceil P_{ev} \cdot P_{ev}^H \rceil_{k,k} \sigma_{ev,w}^2} \right\},$$

wherein $\overline{R}$ is the covariance of the AN and the effective channel is $\tilde{H}_{ev,\mathit{eff}} = P_{ev} \cdot \tilde{H}_{ev} \cdot \tilde{P}$.

As Eavesdropper SNR decreases, its error performance will degrade, to a low level that it will be difficult for the eavesdropper to reliably decode the data of the UEs.

Furthermore, to perform the respective scheduler operations or tasks, respectively, the scheduler 76 may be fed with at least one of:

Target connectivity requirements, which could be, for instance, the target data rate (or spectral efficiency) and/or the target error performance of the connectivity links;

Target security requirements, which could be, for instance, a lower bound on the error performance of eavesdroppers reception;

Radar sensing information which could be, for instance:
Ground mapping
Localization information on the active UEs and eavesdroppers such as geographical positions of the UEs and eavesdropper positions;

Operational data from the central processing unit 23 which could be, for instance:
The measured and/or estimated channels between the APs and UEs: $\tilde{H}$, $\overline{H}$
The measured UE noises: $\sigma_w^2$ Cell-free network topology and/or geometry which may be communicated once as the cell-free network topology does not change, for example, geographical positions of the APs.

Based on at least a part of these inputs, the scheduler 76 may estimate the link quality between each APs and eavesdroppers based on, for example, the geographical positions of eavesdroppers and/or the access topology and/or any historical data.

This may give an indication on how good or bad is an AP from the link security point of view when used for data transmission. Ideally, the scheduler 76 could estimate the channels between the APs and eavesdroppers, namely $\tilde{H}_{ev}$ and $\overline{H}_{ev}$. If the eavesdropper is in the vicinity of one or more UEs, the scheduler 76 can estimate $\tilde{H}_{ev}$ and $\overline{H}_{ev}$ for example by extrapolating the available estimates $\tilde{H}$, $\overline{H}$ taking into account the geographical information.

Alternatively, the scheduler 76 can use historical channel estimates of UEs at the same position or very close to the respective eavesdropper. An initial historical data covering most or entire coverage area can also be built at the beginning by moving one or more targets (UEs) and for example every time estimate and record the channel between APs and the moving target per geographical position. This may give an indication on the quality of the AP-eavesdropper links that can be regularly updated during the corresponding showtime.

Taking the connectivity and/or security requirements, the scheduler 76 then may decide on at least one of (or any combination thereof):

The operation mode of the APs by mapping each AP to either the connectivity cluster or to the security cluster or to both clusters. The scheduler 76 can also decide to switch-off some APs. For instance, to maximize the error detection of the respective eavesdropper, a good clustering policy could avoid using for connectivity the APs that are in the vicinity of the respective eavesdropper, and when this is not possible for some reasons, then some APs in the vicinity could send sufficient artificial noise to jam eavesdroppers' reception.

The physical layer configuration including at least one of (or any combination thereof):
the data and AN shaping (through $\tilde{P}$, $\overline{P}$)
the data and AN power loading (through $\tilde{\xi}$, $\overline{\xi}$)
the AN statistical distribution (for example, through $\overline{R}$), the channel coding and the modulation; for instance:
when some potential APs cannot be scheduled for some UEs, and that there is only limited number of APs to serve these UEs, the channel coding can be increased allowing the UEs to operate at low SNR while still being able to achieve their target spectral efficiency (target data rate).

If this is not possible, the scheduler 76 can decide to lower the expected target spectral efficiency because none of the configurations allow to meet both the security and the connectivity requirements and the priority may for example be given to secure links for critical applications.

Furthermore, the S-APs can exploit the connectivity control information for the data communication network slice and use the data transceivers for sending AN. For instance, the channel between each S-AP and the UEs can be estimated using the uplink pilot symbols as in any D-AP. For example, a shaped AN can be generated that could have a limited or even negligible impact on the desired users' transmission.

Now, some examples of respective scheduling policies are given in the following:

The scheduler 76 can decide to slice the network depending on the instantaneous requirements. For instance, if it turns out that there is more threat, then the D-APs set can be reduced, and the S-APs set increased and vice versa.

An example of physical layer settings may be analog and/or digital beamforming that can be adapted if a priori information on eavesdroppers topology is known. For instance, if the beamforming relies on direct-line-of-sight (LOS), it may be more secure to beamform in different directions to worsen the channels of eavesdroppers.

One could also continuously change the beamforming towards the users such that the respective eavesdropper will not have enough time to track and estimate the channels. In this case, some pilots could be sent or indications in which way the beamforming has been changed such that connectivity users can properly decode the data. Furthermore, localizing eavesdroppers and using this information together with the position of the connectivity users may allow for a better APs clustering.

Figure 5:
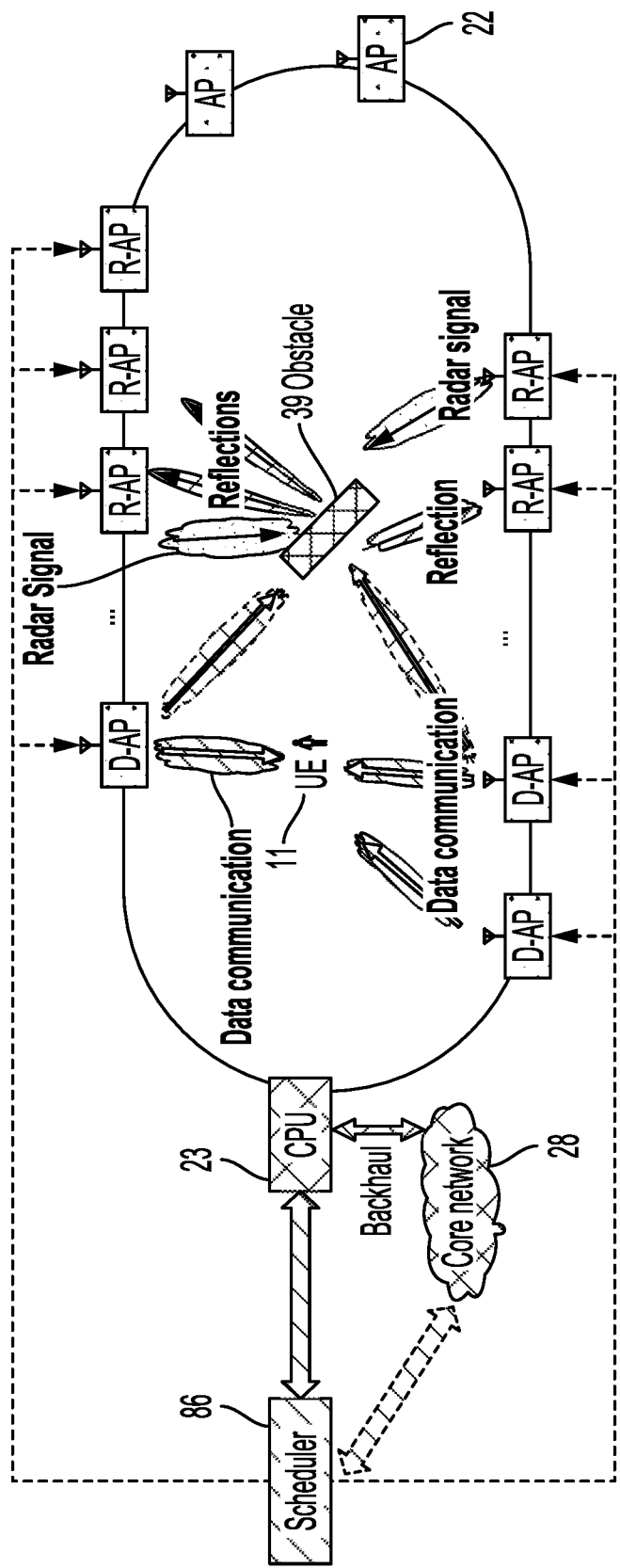
FIG. 5 shows radar signals and reflection signals generated or received by access points in the radar slice, according to an example.
Figure 6:
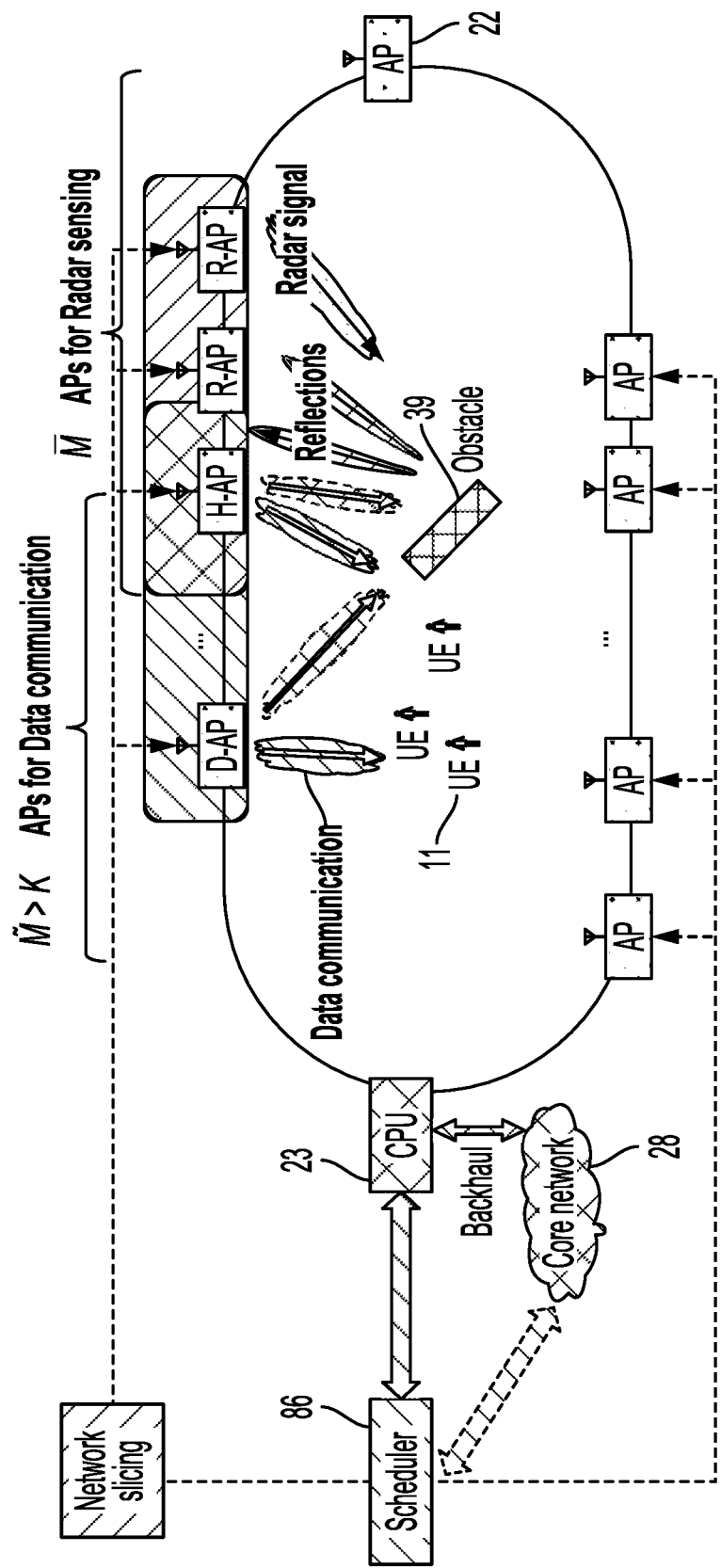
FIG. 6 shows a sliced network with different access point operating modes, according to an example.

Moreover, with respect to scheduler 86, for example being an embodiment of the above-mentioned scheduler 56 or 76, as illustrated by each of FIG. 5 and FIG. 6, the scheduler 86, depending on the target connectivity and/or sensing requirements, may adaptively slice the cell-free network by allocating more or less resources for connectivity ($\tilde{M}$ D-APs) and for sensing ($\tilde{M}$ R-APs).

Figure 7:
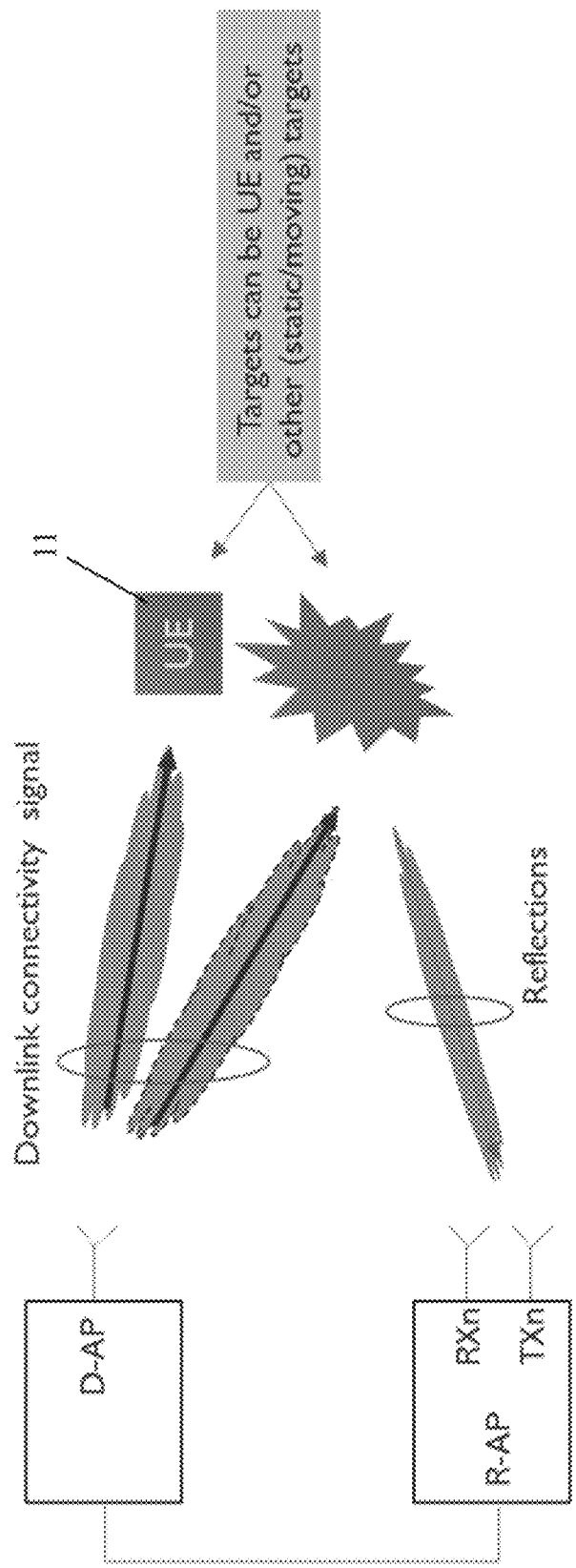
FIG. 7 illustrates a downlink connectivity signal which is also used as a radar signal, according to an example.
Figure 8:
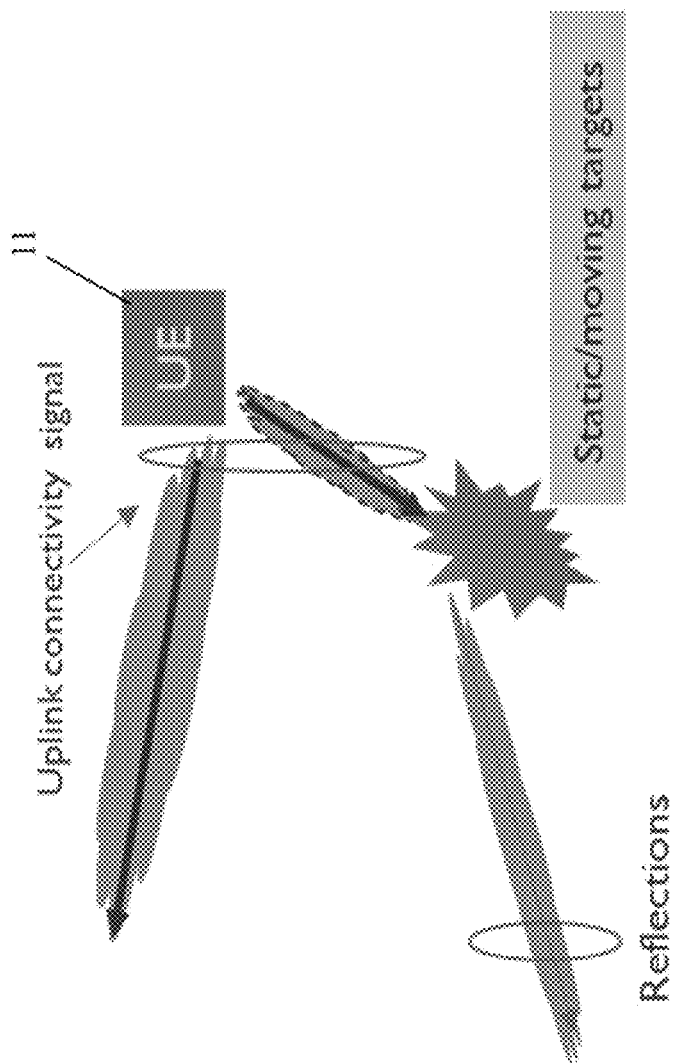
FIG. 8 shows an uplink connectivity signal which is also used as a radar signal, according to an example.

In addition to this or as an alternative, the scheduler 86, depending on the target connectivity and/or sensing requirements, may determine the type of radar signals and its sources with two options:

Intertwined connectivity and radar mode: The radar signals are:
at least a subset of downlink connectivity signals which are a priori known as depicted in FIG. 7, and/or
at least a subset of the uplink connectivity signals as depicted in FIG. 8, which may be in principle known if pilot data is present or can be reconstructed if payload is present in the D-APs.

Figure 9:
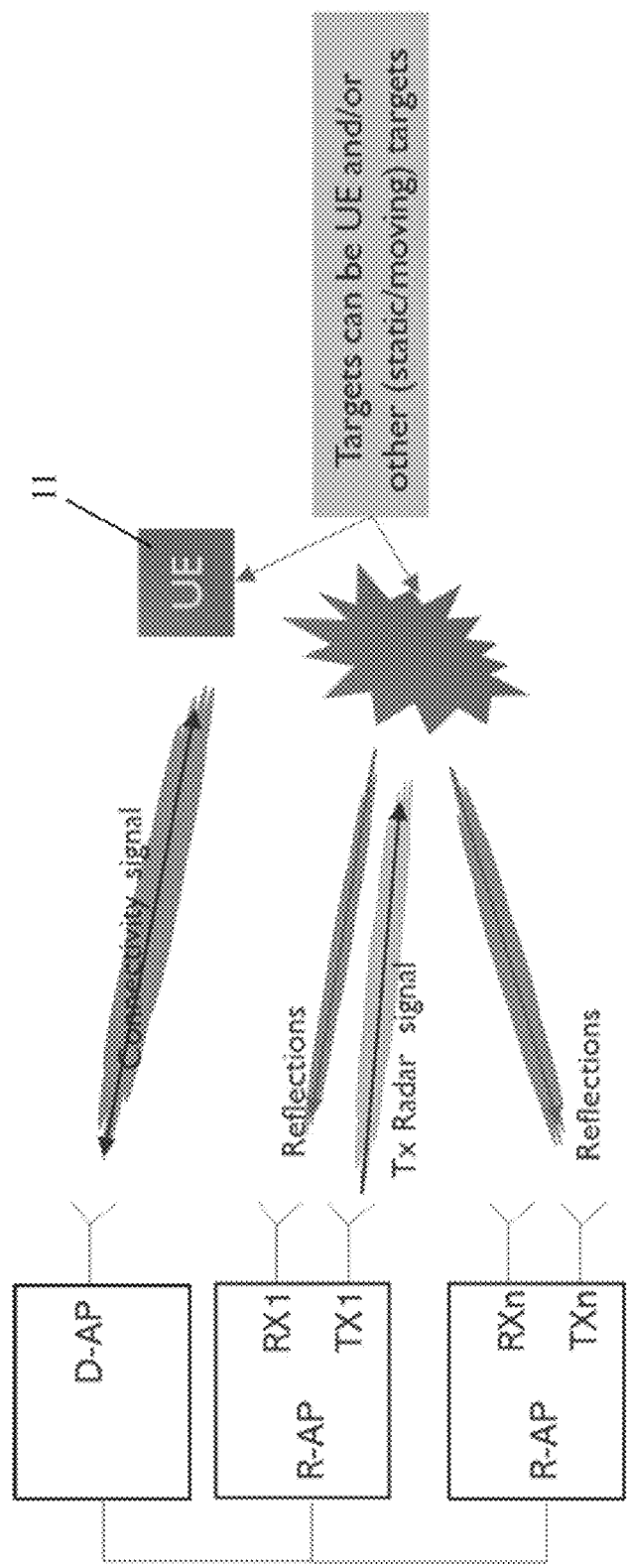
FIG. 9 shows several access points of a radar cluster which send dedicated radar signals and receive the corresponding reflection, according to an example.

Independent connectivity and radar mode: R-APs are split into transmitters of radar signals and receivers of the corresponding reflections as depicted in FIG. 9.

Further additionally or further alternatively, the scheduler 86, depending on the target connectivity and/or sensing requirements, may request a feedback from the central processing unit 23 and/or the radar processing engine 24 for example to re-slice the cell free radio access. With respect to the radar processing engine 24 mentioned above, it is noted that the scheduler 86 or the CPU 23 may comprise the radar processing engine 24.

Furthermore, when executing these tasks, the scheduler 86 could make sure that the target connectivity and/or sensing and/or security requirements are fulfilled. In this context, for the connectivity and/or security, relevant performance measures could be, for instance, error performance that could be minimized.

Moreover, for the radar sensing, relevant performance measures could be, for example, higher angular resolution that can be increased by increasing the subset of (receiving) R-APs which improves the SNR per reflector.

In addition to this or as an alternative, higher range radar resolution can be achieved through carrier aggregation per R-AP and harvesting the reflections from the same R-AP and/or by sending FMCW-radar (Frequency Modulated Continuous-Wave radar) and/or digitally modulated radars, such as PMCW-radar (Phase Modulated Continuous-Wave radar), OFDM (Orthogonal Frequency-Division Multiplexing), per R-AP and harvesting the reflections from the same R-AP.

Figure 10:
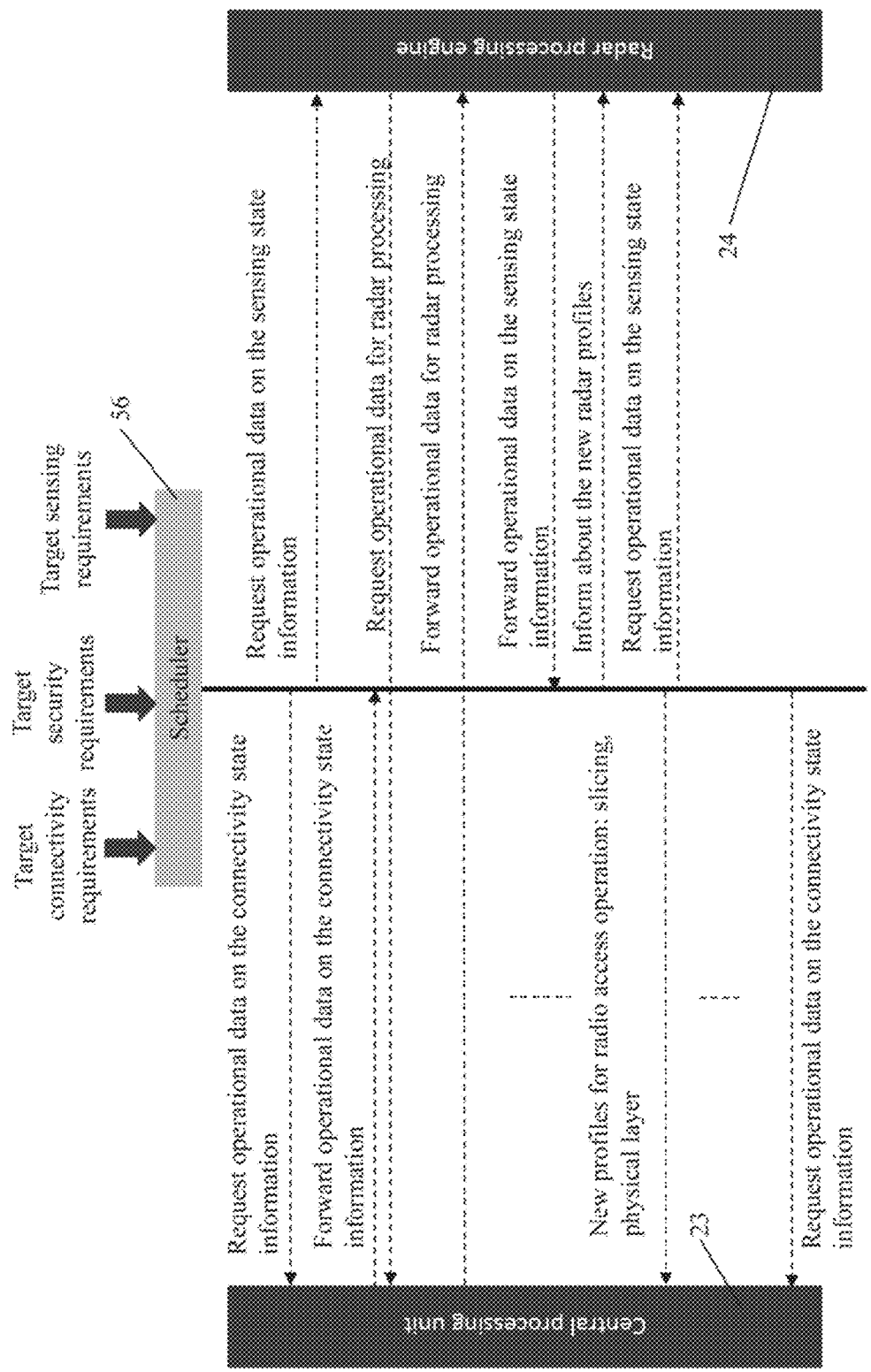
FIG. 10 shows a sequence diagram in the context of the scheduler of FIG. 3, according to an example.

Now, with respect to FIG. 10, a sequence diagram in the context of the intelligent scheduler 56 according to FIG. 3 is illustrated. As already shown by FIG. 3, the scheduler 56 is provided with target connectivity requirements, target security requirements, and target sensing requirements. In this sequence according to FIG. 10, the scheduler 56 first requests operational data on the respective connectivity state information from the CPU 23. Then, the scheduler 56 requests operational data on the respective sensing state information from the radar processing engine 24. It is noted that the foregoing requests can be issued in different orders or in a simultaneous manner.

Furthermore, the CPU 23 forwards the operational data on the connectivity state information to the scheduler 56. Additionally, the radar processing engine 24 requests operational data for the respective radar processing from the CPU 23 via the scheduler 56. Afterwards, the CPU 23 forwards the operational data for the radar processing to the radar processing engine 24 via the scheduler 56. It is noted that in the case of an alternative architecture with separate radar sensing infrastructure, there could be limited or no information exchange between the CPU 23 and the radar processing engine 24.

Moreover, the radar processing engine 24 forwards the above-mentioned operational data on the sensing state information to the scheduler 56. In addition to this, whereas the scheduler 56 provides new profiles for the respective radio access operation such as slicing and/or the corresponding physical layer, for example the corresponding connectivity and/or security and/or radar physical layer, for the CPU 23, the scheduler 56—for example simultaneously—informs the radar processing engine 24 about the new radar profiles.

After further sequences, the scheduler 56 requests operational data on the sensing state information from the radar processing engine 24 again. Then, the scheduler 56 requests operational data on the connectivity state information from the CPU 23 again.

Figure 11:
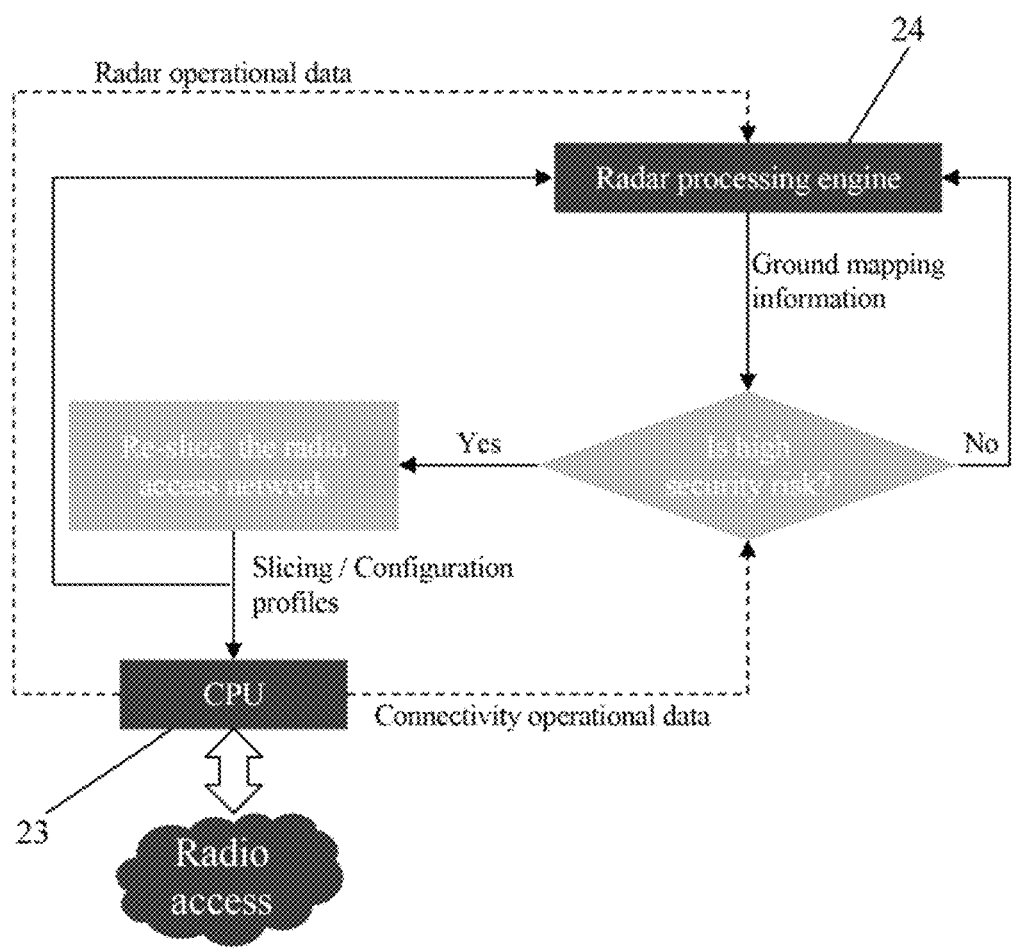
FIG. 11 is a flow chart of functionality of the scheduler of FIG. 3, according to an example.

With respect to FIG. 11, a flow chart in the context of the scheduler 56 according to FIG. 3 is illustrated. In this context, on the basis of the respective ground mapping information provided by the radar processing engine 24 and/or the respective connectivity operational data provided by the CPU 23, it is decided, if there is a high security risk.

In the case that there is no high security risk, the respective ground mapping information may for example be updated by the radar processing engine 24. Otherwise, in the case that there is a high security risk, the respective radio access network is re-sliced and/or reconfigured. In addition to this, the corresponding slicing and/or configuration profiles are provided for the CPU 23.

As it can further be seen from FIG. 11, the CPU 23 might not only provide the connectivity operational data for the above-mentioned decision, but also the respective radar operational data for the radar processing engine 24. In this context, it is noted that the above-mentioned ground mapping information may be based on the radar operational data.

Figure 12:
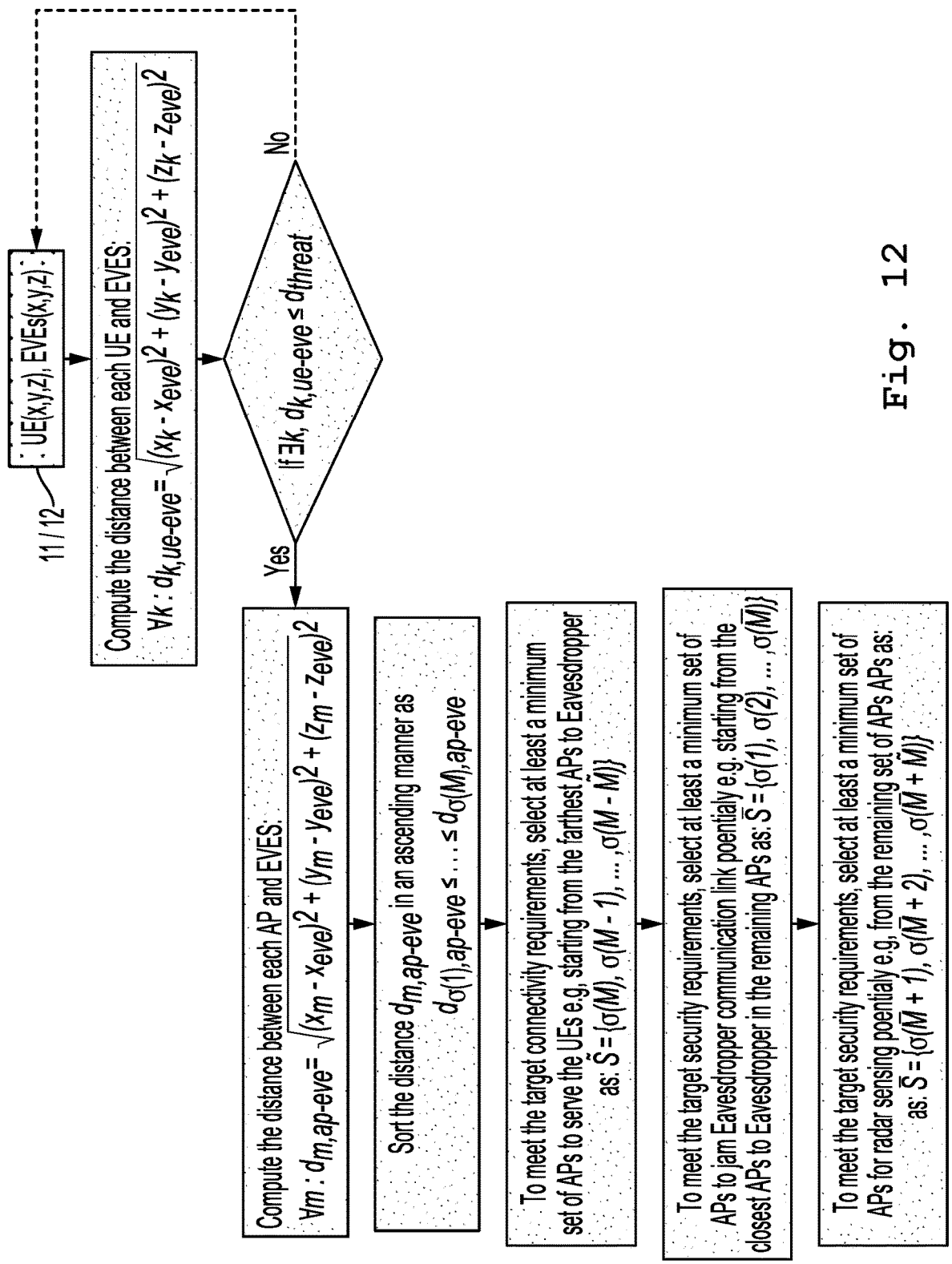
FIG. 12 is a flow chart of network slicing, according to an example.

Furthermore, in accordance with FIG. 12, a flow chart of network slicing in the sense of the disclosure is illustrated. In this context, as an initial step, with respect to the at least one user equipment (UE) 11 and the at least one eavesdropper (EVES) 12 with corresponding coordinates (x, y, z), the respective distance between each UE and EVES is computed according to the following formula:

$$\forall k: d_{k,ue-eve} = \sqrt{(x_k - x_{eve})^2 + (y_k - y_{eve})^2 + (z_k - z_{eve})^2},$$

wherein k=1 ... K applies.

Furthermore, if the following formula does not apply, it may for example be continued with the above-mentioned initial step:

$$\exists k, d_{k,ue-eve} \leq d_{threat},$$

wherein $d_{threat}$ denotes a threat distance.

Otherwise, if the formula applies, a risk may be declared, which may lead to at least a part of the following steps. For example, each of the steps is performed for example in the order as explained below.

As a first step (after the above-mentioned initial step), the respective distance between each wireless communication unit or access point (AP), respectively, and the EVES is computed according to the following equation:

$$\forall m: d_{m,ap-eve} = \sqrt{(x_m - x_{eve})^2 + (y_m - y_{eve})^2 + (z_m - z_{eve})^2},$$

wherein m=1 ... M applies.

A second step may comprise sorting the distance $d_{m,ap-eve}$ in an ascending manner as $d_{\sigma(1),ap-eve} \leq \ldots \leq d_{\sigma(M),ap-eve}$.

Furthermore, as a third step, for example to meet the respective target connectivity requirements, at least a minimum set of APs to serve the UEs is selected. In this context, for instance, it may be started from the farthest APs to eavesdropper as $\tilde{S} = \{\sigma(M), \sigma(M-1) \ldots, \sigma(M-\tilde{M})\}$.

As a fourth step, for example to meet the respective target security requirements, at least a minimum set of APs to jam eavesdropper communication link is selected. In this context, for example, it may be started from the closest APs to eavesdropper in the remaining APs as $\overline{S} = \{\sigma(1), \sigma(2), \ldots, \sigma(\overline{M})\}$.

Moreover, as a fifth step, for example to meet the respective target sensing requirements, at least a minimum set of APs for radar sensing is selected. In this context, for instance, it may be selected from the remaining set of APs as $\check{S} = \{\sigma(\overline{M}+1), \sigma(\overline{M}+2), \ldots, \sigma(\overline{M}+\check{M})\}$.

Additionally or alternatively, it is noted that the step of keeping the respective slices unchanged may be comprised. Further additionally or further alternatively, the step of slicing the respective network again may be comprised for example to meet and/or further improve on the respective target connectivity and/or target sensing without altering the respective security requirements.

Figure 13:
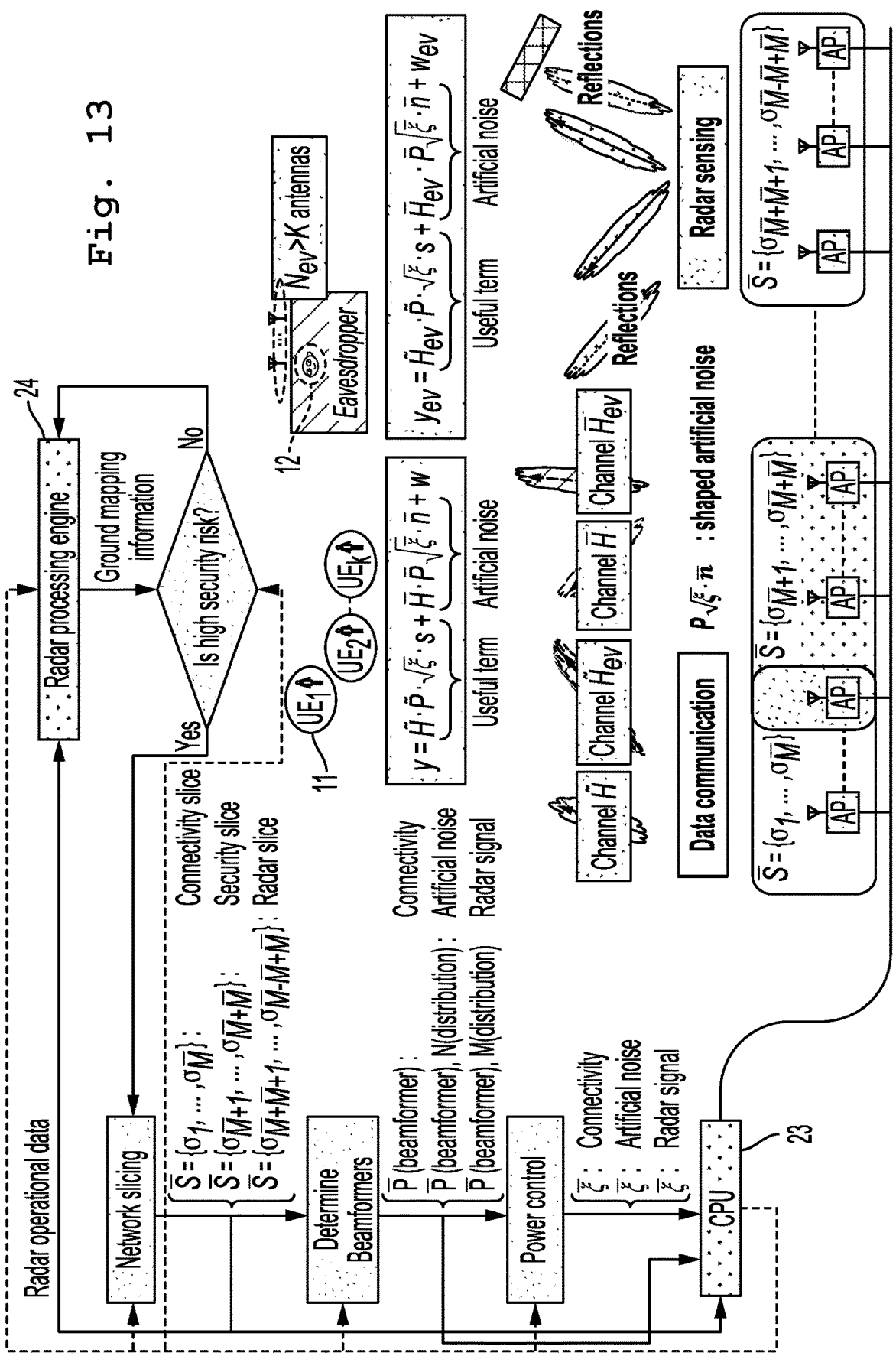
FIG. 13 is a flow chart of functionality of the scheduler of FIG. 3, according to an example.

Now, with respect to FIG. 13, a further flow chart in the context of the intelligent scheduler 56 according FIG. 3 is shown. It is further noted that FIG. 13 is based on the flow chart of FIG. 11 with additional details. Accordingly, the explanations regarding FIG. 3 or FIG. 11, respectively, may analogously apply. In accordance with FIG. 13, in the case that there is a high security risk, the network is sliced. In this context, there are a connectivity slice ($\tilde{S}$), a security slice ($\overline{S}$), and a radar slice ($\check{S}$).

Furthermore, after network slicing and/or configuration, the respective beamformers are determined. In this context, the beamformers are determined with respect to connectivity, artificial noise, and radar signal(s). Moreover, after determining the respective beamformers, the respective power is controlled. In this context, the power is controlled with respect to connectivity, artificial noise, and radar signal(s).

As it can further be seen from FIG. 13, the above-mentioned network slicing and/or configuration, determination of beamformers, power control, or any combination thereof may for example be configured by the CPU 23 on the basis of at least a part of the respective radar operational data.

Figure 14:
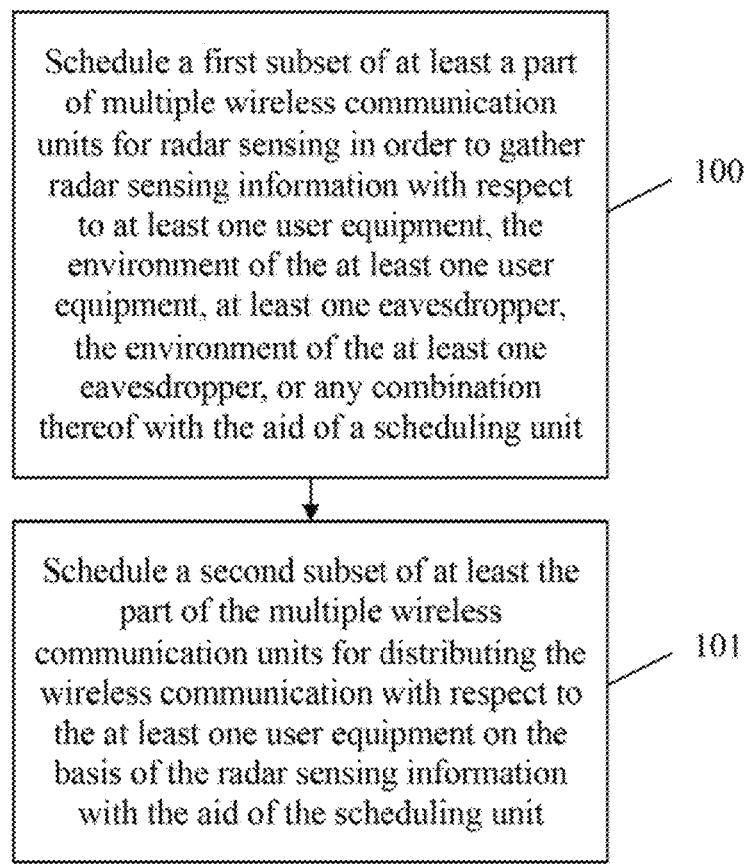
FIG. 14 is a flow chart depicting functionality of the scheduler of FIG. 3, according to an example.

Finally, FIG. 14 shows a flow chart of a method for providing distributed wireless communication with respect to at least one user equipment with connectivity and/or security against at least one eavesdropper. In a first step 100, a first subset of multiple wireless communication units is scheduled for radar sensing in order to gather radar sensing information with respect to the at least one user equipment, the environment of the at least one user equipment, the at least one eavesdropper, the environment of the at least one eavesdropper, or any combination thereof with the aid of a scheduling unit. Then, in a second step 101, a second subset of the multiple wireless communication units is scheduled for distributing the wireless communication with respect to the at least one user equipment on the basis of the radar sensing information with the aid of the scheduling unit.

For example, the method comprises the step of scheduling a third subset of the multiple wireless communication units for interfering the at least one eavesdropper on the basis of the radar sensing information with the aid of the scheduling unit.

For example, the first subset and the second subset overlap each other. In addition to this or as an alternative, in the case of the third subset, at least two of the first subset, the second subset, and the third subset, for example the first subset and the third subset, may overlap each other.

For example, the at least one eavesdropper comprises sending or beamforming noise, for example artificial noise, to the at least one eavesdropper.

Additionally or alternatively, the method may comprise the step of scheduling another subset of at least the part of the multiple wireless communication units for being deactivated on the basis of the radar sensing information with the aid of the scheduling unit.

Further additionally or further alternatively, the method may comprise the step of connecting at least one processing unit to at least the part of the multiple wireless communication units in a connection line, for example being based on a wired connection, for example comprising or being a fronthaul link.

In this context, the method may comprise the step of providing operational information for the scheduling unit with the aid of the at least one processing unit in addition to the radar sensing information. With respect to the multiple wireless communication units, it is noted that the multiple wireless communication units may comprise or be multiple access points.

In addition to this or as an alternative, with respect to the distributed wireless communication, it is noted that the distributed wireless communication may be based on time division duplexing. Additionally or alternatively, in the case of the at least one processing unit, the scheduling unit may comprise at least one of the at least one processing unit.

For example the radar sensing information comprises ground mapping information and/or localization information regarding the at least one user equipment and/or the at least one eavesdropper.

For example the operational information comprises at least one of topology, for example access topology, of the distributed wireless communication, channel quality indication with respect to the distributed wireless communication, position, for example geographical position, of at least one of the least one user equipment, position, for example geographical position, of at least one of the multiple wireless communication units, noise, for example measured noise, with respect to at least one of the at least one user equipment, traffic requirements of a user, quality of service requirements, or any combination thereof.

For example, the method comprises the step of performing the scheduling with the aid of the scheduling unit and at least one of the at least one processing unit.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A system comprising:
   transceivers distributed in a wired fronthaul link such that the transceivers are connected to each other via glass optical fiber, twisted pairs, coaxial cables, or plastic optical fiber, and
   a computing device,
   wherein the computing device is configured to perform functions comprising:
   causing a first subset of the transceivers to gather radar sensing information indicating at least one user equipment and at least one eavesdropper,
   using the radar sensing information to select a second subset of the transceivers, wherein the second subset includes a first transceiver not included in the first subset or the first subset includes a second transceiver not included in the second subset, and
   causing the second subset of the transceivers to distribute wireless communication to the at least one user equipment.

2. The system according to claim 1, wherein the functions further comprise using the radar sensing information to select a third subset of the transceivers and causing the third subset of the transceivers to interfere the at least one eavesdropper.

3. The system according to claim 2, wherein at least two of the transceivers of the first subset, the second subset, and the third subset are the same.

4. The system according to claim 2, wherein causing the third subset of the transceivers to interfere the at least one eavesdropper comprises sending or beamforming noise to the at least one eavesdropper.

5. The system according to claim 1, wherein the first subset and the second subset have a common transceiver.

6. The system according to claim 1, wherein the functions further comprise deactivating a third subset of the transceivers based on the radar sensing information.

7. The system according to claim 1,
   further comprising at least one processor connected to the transceivers in the wired fronthaul link,
   wherein the at least one processor is configured to provide operational information for the computing device in addition to the radar sensing information.

8. The system according to claim 7, wherein the operational information comprises at least one of topology of a distributed wireless communication, channel quality indication with respect to the distributed wireless communication, position of the at least one user equipment, position of the transceivers, noise with respect to the at least one user equipment, traffic requirements of a user, or quality of service requirements.

9. The system according to claim 7, wherein the computing device is configured to perform scheduling via the at least one processor.

10. The system according to claim 1, wherein the transceivers are access points.

11. The system according to claim 1, wherein a distributed wireless communication facilitated by the transceivers is based on time division duplexing.

12. The system according to claim 1, wherein the computing device comprises at least one processor.

13. The system according to claim 1, wherein the radar sensing information comprises ground mapping information or localization information regarding the at least one user equipment and the at least one eavesdropper.

14. A method comprising:
    causing, via a computing device, a first subset of transceivers to gather radar sensing information indicating at least one user equipment and at least one eavesdropper, wherein the transceivers are distributed in a wired fronthaul link such that the transceivers are connected to each other via glass optical fiber, twisted pairs, coaxial cables, or plastic optical fiber,
    using, via the computing device, the radar sensing information to select a second subset of the transceivers, wherein the second subset includes a first transceiver not included in the first subset or the first subset includes a second transceiver not included in the second subset, and
    causing, via the computing device, the second subset of the transceivers to distribute wireless communication to the at least one user equipment.

15. The method according to claim 14, further comprising causing a third subset of the transceivers to interfere the at least one eavesdropper based on the radar sensing information.

16. The method according to claim 15, wherein at least two of the transceivers of the first subset, the second subset, and the third subset are the same.

17. The method according to claim 14, wherein the first subset and the second subset have a common transceiver.

18. The method according to claim 15, wherein causing the third subset of the transceivers to interfere the at least one eavesdropper comprises sending or beamforming noise to the at least one eavesdropper.

19. The method according to claim 14, further comprising deactivating a third subset of the transceivers based on the radar sensing information.

20. A system comprising:
- transceivers distributed in a wired fronthaul link, and
- a computing device,
- wherein the computing device is configured to perform functions comprising:
- causing a first subset of the transceivers to gather first radar sensing information indicating at least one user equipment and at least one eavesdropper,
- using the first radar sensing information to select a second subset of the transceivers,
- causing the second subset of the transceivers to distribute first wireless communication to the at least one user equipment,
- selecting, using the first radar sensing information, a third subset of the transceivers and a fourth subset of the transceivers, wherein the third subset differs from the first subset by at least one transceiver and the fourth subset differs from the second subset by at least one transceiver,
- causing the third subset of the transceivers to gather second radar sensing information indicating the least one user equipment and the at least one eavesdropper, and
- causing the fourth subset of the transceivers to distribute second wireless communication to the at least one user equipment.

* * * * *